(12) United States Patent
Yim et al.

(10) Patent No.: US 12,236,064 B2
(45) Date of Patent: Feb. 25, 2025

(54) ENCODING/DECODING USER INTERFACE INTERACTIONS

(71) Applicant: Google LLC, Mountain View, CA (US)

(72) Inventors: Keun Soo Yim, San Jose, CA (US); Ilya Firman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/347,374

(22) Filed: Jul. 5, 2023

(65) Prior Publication Data

US 2023/0350550 A1    Nov. 2, 2023

Related U.S. Application Data

(63) Continuation of application No. 17/651,057, filed on Feb. 14, 2022, now Pat. No. 11,726,641.

(51) Int. Cl.
*G06F 3/0484* (2022.01)
*G06F 3/0481* (2022.01)
(Continued)

(52) U.S. Cl.
CPC .......... *G06F 3/0484* (2013.01); *G06F 3/0481* (2013.01); *G06F 3/167* (2013.01);
(Continued)

(58) Field of Classification Search
CPC ...... G06F 3/0484; G06F 3/0481; G06F 3/167; G06F 9/451; G06F 40/205; G06F 40/30; G06V 20/70; G10L 15/1815; G10L 15/22
See application file for complete search history.

(56) References Cited

U.S. PATENT DOCUMENTS 8,805,972 B1 * 8/2014 Merkulov ............. H04W 12/08
                                                       709/221
2006/0085503 A1   4/2006 Stoye et al.
(Continued)

FOREIGN PATENT DOCUMENTS

WO    2021154285 A1    8/2021
WO    2021247070 A1    12/2021

OTHER PUBLICATIONS

A Complete Learning Path to Data Labelling & Annotation <https://drive.google.com/file/d/1dhETBFTmEGkqKYcDcKwOgso-Htl2bKlj/view?usp=sharing>, Jayita Bhattacharyya, Dec. 30, 2020.
(Continued)

*Primary Examiner* — Andrey Belousov
(74) *Attorney, Agent, or Firm* — Honigman LLP; Brett A. Krueger; Grant Griffith (57) ABSTRACT

A method of encoding and decoding user interface interactions includes receiving a query from a user captured by an assistant-enabled device associated with the user. The query includes a user intent for interacting with an application. The method includes obtaining, for the application, a set of categorized actions. Each categorized action of the set of categorized actions is associated with one or more parameters and represents a high-level description of the user intent of the user interacting with the application. For each respective categorized action of the set of categorized actions, the method includes selecting a respective script associated with the respective categorized action that performs one or more low-level interactions with the application and executing the respective script to represent the user intent for interacting with the application.

20 Claims, 7 Drawing Sheets

(51) Int. Cl.
  *G06F 3/16*    (2006.01)
  *G06F 9/451*   (2018.01)
  *G06F 40/205*  (2020.01)
  *G06F 40/30*   (2020.01)
  *G06V 20/70*   (2022.01)
  *G10L 15/18*   (2013.01)
  *G10L 15/22*   (2006.01)

(52) U.S. Cl.
  CPC ............ *G06F 9/451* (2018.02); *G06F 40/205* (2020.01); *G06F 40/30* (2020.01); *G06V 20/70* (2022.01); *G10L 15/1815* (2013.01); *G10L 15/22* (2013.01)

(56) References Cited

U.S. PATENT DOCUMENTS

| | | | |
|---|---|---|---|
| 2014/0053021 A1 | 2/2014 | Schwartz et al. | |
| 2015/0227633 A1 | 8/2015 | Shapira | |
| 2019/0012142 A1* | 1/2019 | Bang .................... | G06F 3/0481 |

OTHER PUBLICATIONS

Now Platform Capabilities, <https://drive.google.com/file/d/1dN4AfDwyfROov78BjwSRmGDzECfN_EnN/view?usp=sharing>, ServiceNow, Oct. 12, 2021.

USPTO. Office Action relating to U.S. Appl. No. 17/651,057, dated Dec. 22, 2023.

International Search Report and Written Opinion for the related Application No. PCT/US2023/062336, dated Apr. 28, 2023, 108 pages.

* cited by examiner

ENCODING/DECODING USER INTERFACE INTERACTIONS

CROSS-REFERENCE TO RELATED APPLICATIONS

This U.S. patent application is a continuation of, and claims priority under 35 U.S.C. § 120 from, U.S. patent application Ser. No. 17/651,057, filed on Feb. 14, 2022. The disclosure of this prior application is considered part of the disclosure of this application and is hereby incorporated by reference in its entirety.

TECHNICAL FIELD

This disclosure relates to encoding and/or decoding user interface interactions and associated mobile application contexts.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. The speech-enabled environment may be controlled by a virtual assistant program or application. To respond to some queries or commands, the virtual assistant may fulfill or implement logic via a zero-party (0P) interaction, a first-party (1P) interaction, or a third-party (3P) interaction. A 0P interaction is one performed by the virtual assistant itself (i.e., by code or logic implemented within the virtual assistant application). A 1P interaction is an interaction with another application separate from the virtual assistant, but the other application includes code or logic specifically designed for operating or cooperating with the virtual assistant application. In contrast, a 3P interaction is an interaction with another application separate from the virtual assistant that has no code or logic designed for operating or cooperating with the virtual assistant application.

SUMMARY

One aspect of the disclosure provides a method of encoding and decoding user interface interactions. The computer-implemented method, when executed by data processing hardware, causes the data processing hardware to perform operations. The operations include receiving a query from a user captured by an assistant-enabled device associated with the user. The query includes a user intent for interacting with an application. The operations include obtaining, for the application, a set of categorized actions. Each categorized action of the set of categorized actions is associated with one or more parameters and represents a high-level description of the user intent of the user interacting with the application. For each respective categorized action of the set of categorized actions, the operations include selecting a respective script associated with the respective categorized action that performs one or more low-level interactions with the application and executing the respective script to represent the user intent for interacting with the application.

Implementations of the disclosure may include one or more of the following optional features. In some implementations, obtaining the set of categorized actions includes, for each respective categorized action of the set of categorized actions, generating, using the application, one or more contextual annotations and translating the one or more contextual annotations into the respective categorized action. In some of these implementations, generating the one or more contextual annotations includes performing optical character recognition (OCR) or pattern recognition on image data corresponding to a screenshot captured of a user interface (UI) of the application. In some of these implementations, generating the one or more contextual annotations includes parsing an accessibility tree associated with the application.

In some examples, the one or more low-level interactions include actuating, at a user interface (UI) of the application, a user input at a predetermined location on the UI of the application. Optionally, selecting the respective script is based on an identity of the application and a version of the application. Selecting the respective script may include passing the respective script the one or more parameters associated with the respective categorized action.

In some implementations, when receiving the query from the user, the application is in a foreground of a graphical user interface (GUI) executed by the assistant-enabled device. The assistant-enabled device may execute a digital assistant application configured to provide a digital assistant interface between the user and the assistant-enabled device and the application that is separate and independent from the digital assistant application. In these examples, the assistant application may lack permission to execute the respective script of each respective categorized action of the set of categorized actions. The operating system of the assistant-enabled device, in some examples, executes the respective script of each respective categorized action of the set of categorized actions.

Another aspect of the disclosure provides a system for encoding and decoding user interface interactions. The system includes data processing hardware and memory hardware in communication with the data processing hardware. The memory hardware stores instructions that when executed on the data processing hardware cause the data processing hardware to perform operations. The operations include receiving a query from a user captured by an assistant-enabled device associated with the user. The query includes a user intent for interacting with an application. The operations include obtaining, for the application, a set of categorized actions. Each categorized action of the set of categorized actions is associated with one or more parameters and represents a high-level description of the user intent of the user interacting with the application. For each respective categorized action of the set of categorized actions, the operations include selecting a respective script associated with the respective categorized action that performs one or more low-level interactions with the application and executing the respective script to represent the user intent for interacting with the application.

This aspect may include one or more of the following optional features. In some implementations, obtaining the set of categorized actions includes, for each respective categorized action of the set of categorized actions, generating, using the application, one or more contextual annotations and translating the one or more contextual annotations into the respective categorized action. In some of these implementations, generating the one or more contextual annotations includes performing optical character recognition (OCR) or pattern recognition on image data corresponding to a screenshot captured of a user interface (UI) of the application. In some of these implementations, generating the one or more contextual annotations includes parsing an accessibility tree associated with the application.

In some examples, the one or more low-level interactions include actuating, at a user interface (UI) of the application, a user input at a predetermined location on the UI of the application. Optionally, selecting the respective script is based on an identity of the application and a version of the application. Selecting the respective script may include passing the respective script the one or more parameters associated with the respective categorized action.

In some implementations, when receiving the query from the user, the application is in a foreground of a graphical user interface (GUI) executed by the assistant-enabled device. The assistant-enabled device may execute a digital assistant application configured to provide a digital assistant interface between the user and the assistant-enabled device and the application that is separate and independent from the digital assistant application. In these examples, the assistant application may lack permission to execute the respective script of each respective categorized action of the set of categorized actions. The operating system of the assistant-enabled device, in some examples, executes the respective script of each respective categorized action of the set of categorized actions.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. The speech-enabled environment may be controlled by a virtual assistant program or application. To respond to some queries or commands, the virtual assistant may fulfill or implement logic via a zero-party (0P) interaction, a first-party (1P) interaction, or a third-party (3P) interaction. A 0P interaction is one performed by the virtual assistant itself (i.e., by code or logic implemented within the virtual assistant application). A 1P interaction is an interaction with another application separate from the virtual assistant, but the other application includes code or logic specifically designed for operating or cooperating with the virtual assistant application. In contrast, a 3P interaction is an interaction with another application separate from the virtual assistant that has no code or logic designed for operating or cooperating with the virtual assistant application.

As virtual assistants become more sophisticated, these assistants are increasingly used to perform automation tasks for users. For example, virtual assistants may be used to compose and send emails, perform Internet searches, make restaurant reservations, etc. To fulfill automation queries or commands, virtual assistants may implement their fulfillment logic using 0P, 1P, or 3P interactions. While implementation of automation using 0P or 1P relationships is straightforward, such implementations are not scalable. Instead, 3P is the most scalable way to increase the fulfillment capabilities of automation products (such as virtual assistants) because 3P does not require direct software development work (e.g., for the third party application).

However, for the 3P fulfillment approach, most operating systems (OSes) cannot directly perform low-level user interface (UI) interactions (e.g., actuating a button or entering text into a text field) on behalf of an automation application because the automation application does not have the system privileges or full trust of the user device. While some automation techniques rely on recording and replaying complex macros, these macros tend to be hard to understand, are prone to runtime errors, and generally difficult to develop and/or debug.

Implementations herein include systems and methods that encode and decode complex user interactions and associated application contexts. The systems and methods categorize user intent into high-level abstractions such that the abstractions cannot be used for security attacks (e.g., using the abstraction to perform arbitrary actions via the 3P application such as clicking a button at a certain location repeatedly) when the abstractions are realized as a programming interface.

Figure 1:
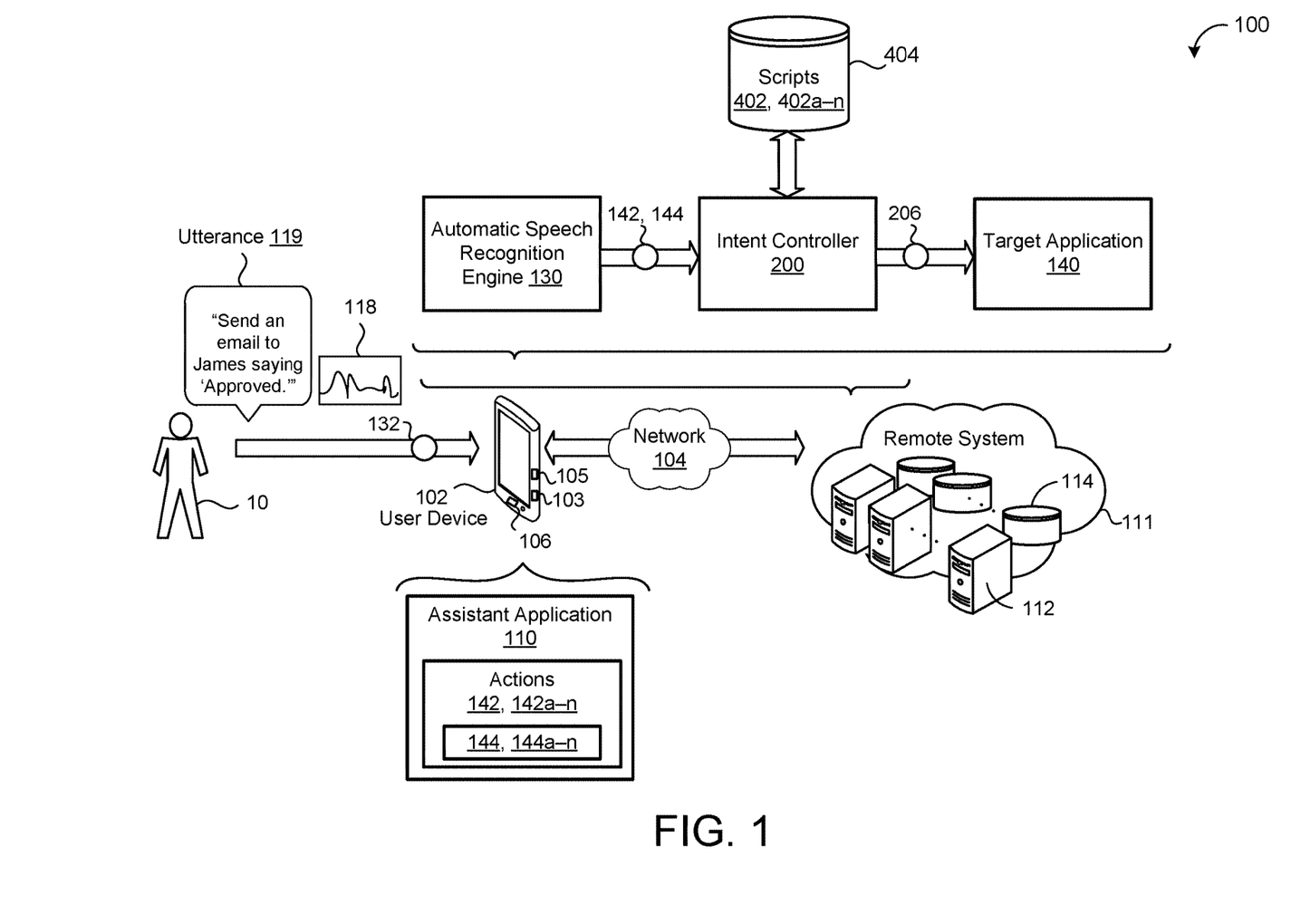
FIG. 1 is a schematic view of an example system for encoding and decoding user interface interactions and associated mobile application contexts using categorized intents and parameters.

Referring to FIG. 1, in some implementations, an example system 100 includes a user device 102 associated with one or more users 10 and in communication with a remote system 111 via a network 104. The user device 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 105. The user device 102 may include or be in communication with one or more microphones 106 for capturing utterances 119 from the respective user 10. The remote system 111 may be a single computer, multiple computers, or a distributed system (e.g., a cloud environment) having scalable/elastic computing resources 112 (e.g., data processing hardware) and/or storage resources 114 (e.g., memory hardware).

The user device 102 at least partially executes an assistant application 110 (e.g., a virtual assistant application or digital assistant application) or any other automation application. At least a portion of the assistant application 110 may execute on the remote system 111. The assistant application 110 receives a query 132 from the user 10. For example, the assistant application 110 obtains streaming audio 118 captured by the microphone(s) 106 from an utterance 119 of the user 10. The user 10, via the utterance 119, communicates the query 132 to the user device 102 (i.e., the assistant application 110). The user 10 may provide the query 132 via other user input (e.g., touch screen, keyboard, mouse, etc.). The query 132 requests or commands the user device 102 (e.g., the assistant application 110) to perform one or more actions within or using a target application 140. The target application executes on the user device 102 (e.g., simultaneously with the assistant application 110). The target application 140, for example, is executing in the foreground of the user device 102. In some examples, the query 132 specifies the target application 140. In yet other examples, the assistant application 110 determines the target application 140 from contextual clues of the query 132 and other contextual information (e.g., applications installed on the user device 102, etc.).

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The target application 140, in some implementations, is a third-party application (i.e., 3P) that is separate and independent from the assistant application 110. That is, the target application 140 does not include programming expressly to facilitate cooperation between the assistant application 110 and the target application 140. The target application 140, in some examples, is authored, controlled, and/or distributed by a vendor or business that is separate from an author, controller, or distributer of the assistant application 110. The user device 102 may execute the assistant application 110 and the target application 140 simultaneously. Here, the query 132 includes the utterance 119 "Send an email to James saying 'Approved'" and accordingly the target application 140 is an email application. For example, the target application 140 is a third-party application that the user 10 downloaded via an online application repository. In this example, the query 132 requests or commands the assistant application 110 to compose an email using the target application 140. The email is to be sent to James and include the text "Approved."

In some implementations, the assistant application 110 includes or is in communication with an automatic speech recognition (ASR) engine 130. The ASR engine 130 performs speech recognition on the query 132 (e.g., using Markov models, neural networks, an end-to-end ASR, etc.). The ASR engine 130 may execute wholly or partially on the user device 102 and/or the remote system 111. In some examples, the user device 102 processes, using the ASR engine 130, the query 132 locally. In other examples, the remote system 111 at least partially executes the ASR engine 130 and the user device 102 transmits data derived from the query 132 to the remote system 111 for some or all of the processing of the query 132. The query 132, in some implementations, includes a user intent for interacting with the target application 140. Here, the query 132 includes "Send an email to James saying 'Approved.'" In this example, the user intent is to compose an email using the target application 140 (e.g., an email client).

Figure 3:
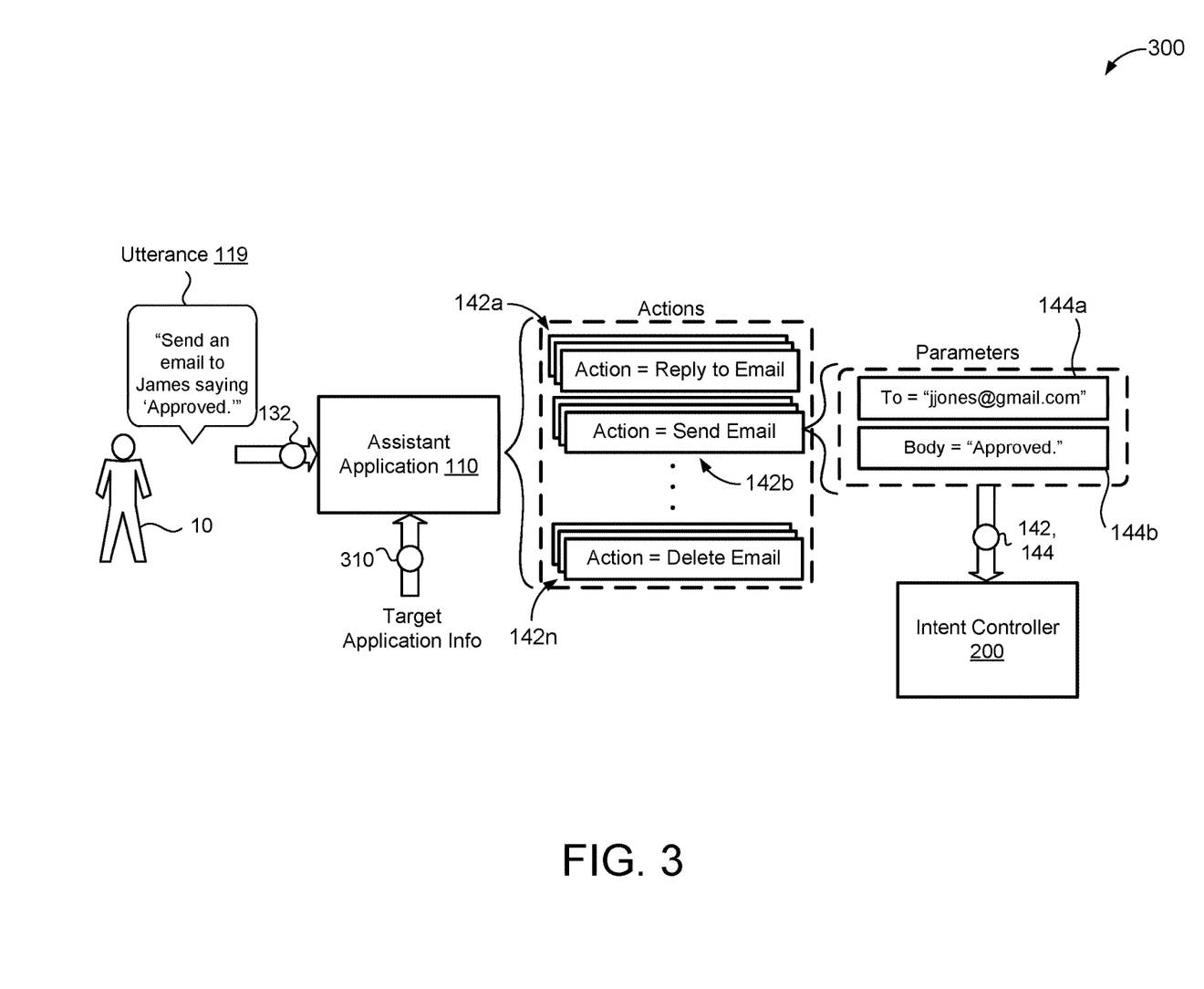
FIG. 3 is a schematic view of exemplary actions and parameters of the system of FIG. 1.

In some examples, and as described in more detail below, the assistant application 110 obtains, for the target application 140, a set of actions 142, 142a-n. Each action 142 may be categorized (i.e., categorized actions 142) according to a high-level description of user intent of the user 10 interacting with the target application 140. Each action 142 may be associated with one or more parameters 144, 144a-n. In some examples, each action 142 and associated parameters 144 form key-value pairs to capture user intent. The actions 142 may be similar to the classification granularity of user intent in natural language understanding (NLU) and fulfillment. That is, each set of actions 142 provide a high-level description of user intent when using the target application 140. For example, when the target application 140 is an email client, one set of actions 142 describes composing an email (e.g., set the recipient, set subject line, set body, send, etc.), another set of actions 142 describes deleting an email, and a third set of actions describes forwarding an email. Each of these set of actions 142, at a high level, describe a potential intent the user 10 may have when interacting with the target application 140. While this example includes an email client as the target application 140, it is understood that the target application 140 may be any type of application with corresponding associated actions 142. For example, the target application 140 is a navigation application, a social media application, a reservation application, a calendar application, a shopping application, etc.

Each set of actions 142 may be categorized to represent a different primary user intent (e.g., sending an email vs. deleting an email). Each set of actions 142 may include any number of actions 142 (i.e., one or more actions 142). The assistant application 110 and/or the ASR engine 130 or any other module executing on the user device 102 and/or the remote system 111, based on the query 132, selects one or more of the sets of actions 142 that best reflect the intent of the user 10 present in the query 132 (e.g., from the utterance 119). In this example, the set of categorized actions 142 for sending an email (FIG. 3) best reflects the user's intent.

The user device 102 at least partially executes an intent controller 200. Some portions of the intent controller 200 may execute on the remote system 111. The intent controller 200 receives the set of categorized actions 142 and parameters 144 or, alternatively, receives the user intent from the ASR engine 130 and/or assistant application 110 and selects the set of categorized actions 142 and associated parameters 144. For each action 142 in the set of actions 142, the intent controller 200 selects one or more scripts 402, 402a-n stored at, for example, a script storage 404 storing the scripts 402 at the user device 102 and/or the remote system 111. As described in more detail below, each selected script 402 performs one or more low-level interactions 206 with the target application 140. For example, the scripts 402 convert the high-level descriptions of the set of categorized actions 142 to application-specific UI interaction commands, such as entering text within a text field. The intent controller 200 may pass the parameters 144 to the scripts 402 directly or derive new parameters using additional contextual information of values (e.g., foreground application identities).

Figure 5:
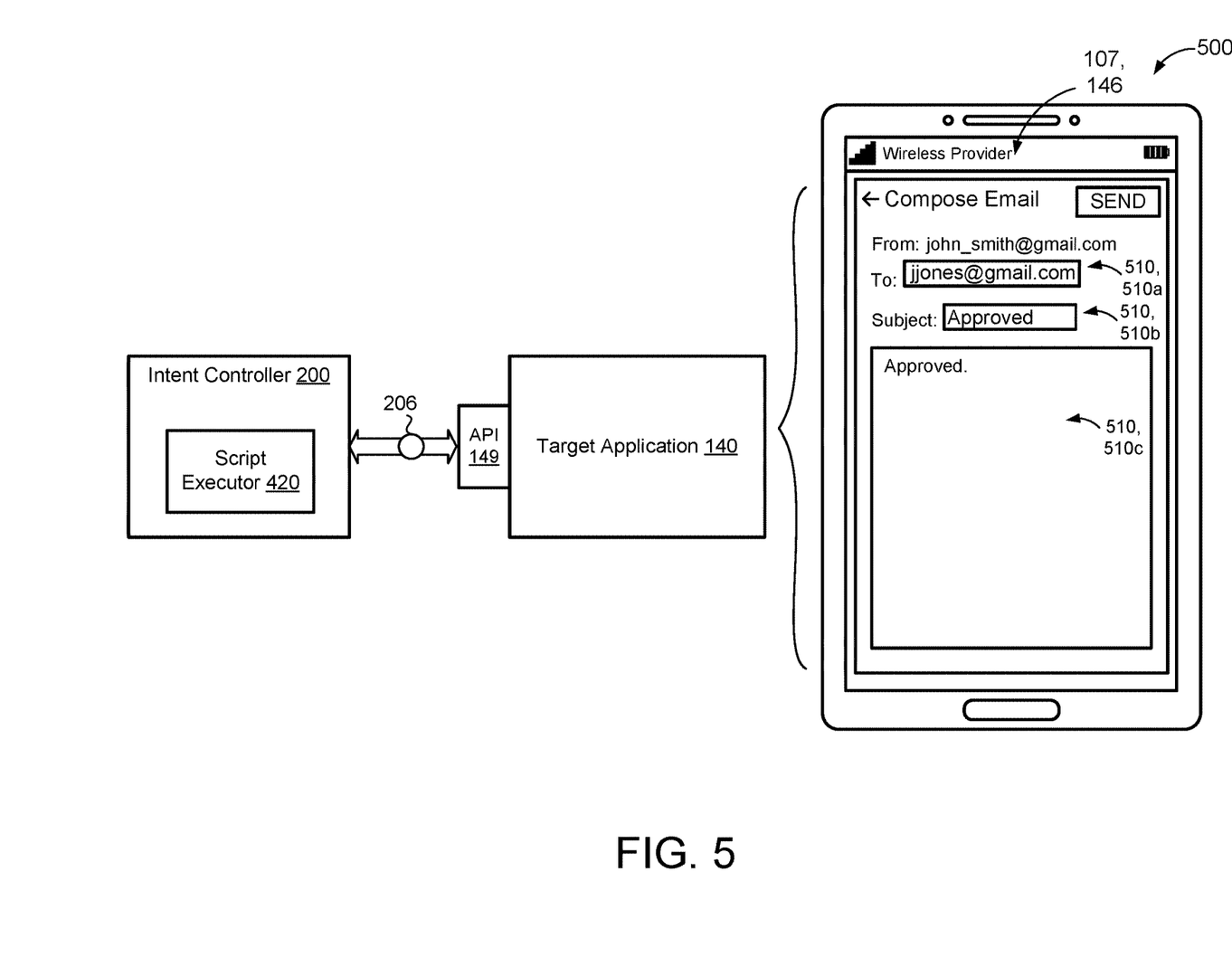
FIG. 5 is a schematic view of executing the scripts of FIG. 4.

The intent controller 200 executes each respective script 402 (i.e., the scripts 402 that reflect the low-level operations 206 of the set of actions 142) to represent the user intent for interacting with the target application 140. In this example, the scripts 402 are selected and executed to compose an email to James with body text of "Approved" (FIG. 5). The intent controller 200 interacts with the target application 140 using the low-level operations 206 (based on execution of the scripts 402).

In some implementations, the intent controller 200 has a level of permission, access, or privilege that exceeds the level of permission of the assistant application 110. For example, the intent controller 200 is part of the operating system (OS) executing on the user device 102. Due to trust or permission issues, the assistant application 110 may be unable or incapable of performing the low-level operations 206 (e.g., via executing the scripts 402) with the target application 140 directly. For example, direct interaction with the UI of the user device 102 (e.g., replicating user input) requires a high-level of trust or permission that is not granted to the assistant application 110 and instead requires trusted portions (i.e., the intent controller 200) to execute. However, allowing the intent controller 200 to perform the low-level operations 206 directly on behalf of the assistant application 110 and/or the ASR engine 130 introduces security vulnerabilities. For example, a malicious application could abuse such an ability to take actions that do not align with the user's intent.

By instead restricting the less-trusted application (e.g., the assistant application 110) to using only high-level descriptions or abstractions of the user intent that have been, for example, already been consented to by the user 10, the system 100 reduces any security risk. Using the illustrated example, the user 10 may provide consent to compose emails but may not provide consent to delete emails. Thus, the intent controller 200 can verify that the user 10 has consented to the actions 142 suggested or selected by the assistant application 110. For example, when the assistant application 110 selects actions 142 related to deleting an email, the intent controller 200 rejects such actions 142. On the other hand, when the assistant application 110 selects actions 142 related to composing an email, the intent controller 200, with or without additional verification checks, proceeds with translating the actions 142 into the appropriate scripts 402.

Figure 2:
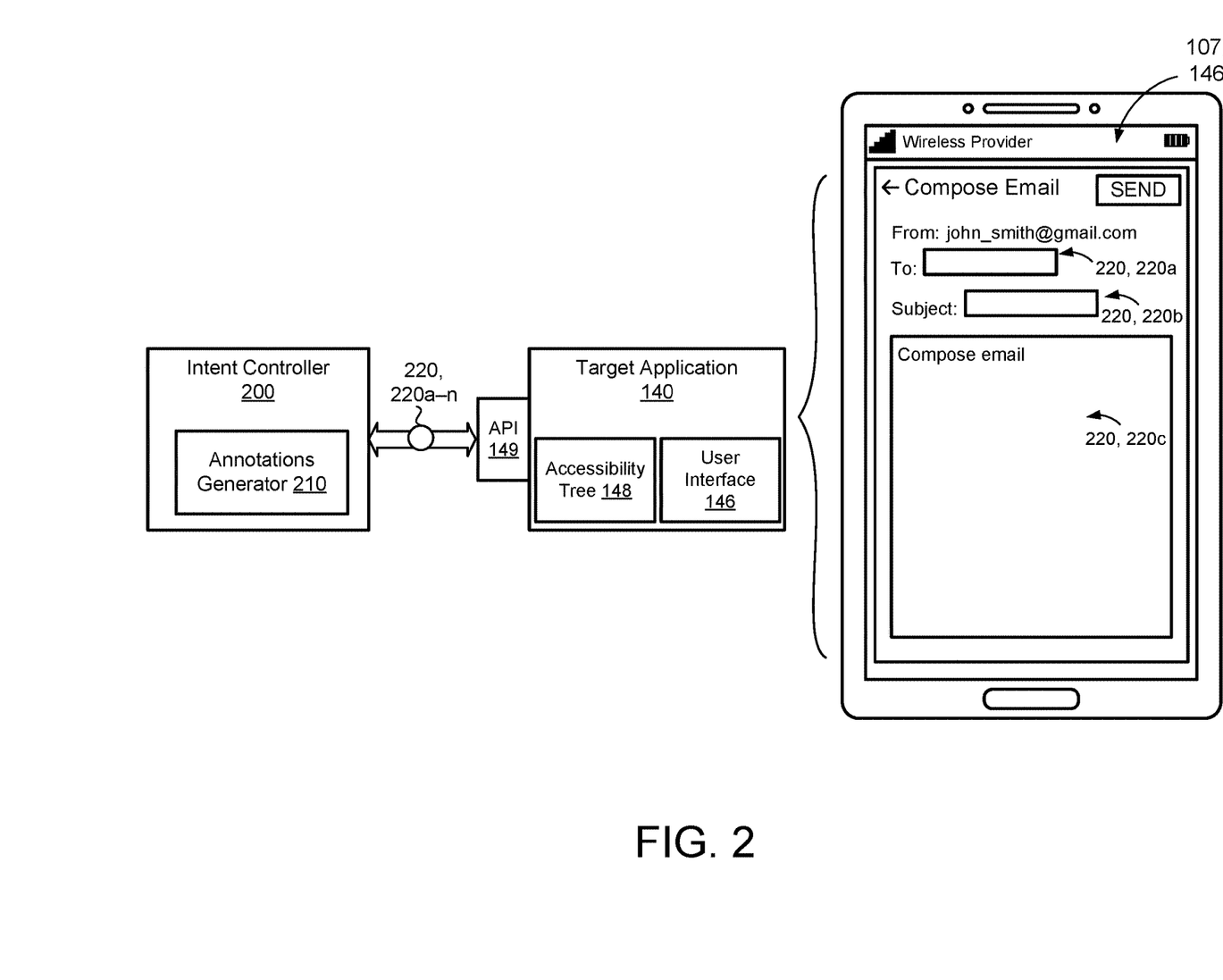
FIG. 2 is a schematic view of exemplary components of the system of FIG. 1 for generating annotations.

Referring now to FIG. 2, in some implementations, an annotations generator 210 of the intent controller 200 obtains, determines, or generates the sets of categorized actions 142 by generating, using the target application 140, one or more contextual annotations 220, 220a-n. The annotations generator 210 may translate the one or more contextual annotations 220 into the respective categorized action(s) 142. For example, the intent controller 200 generates the contextual annotations 220 using screenshots captured of a user interface 146 of the target application 140 via optical character recognition (OCR), image recognition, pattern recognition, etc. Additionally or alternatively, the intent controller 200 generates the contextual annotations 220 by parsing an accessibility tree 148 of the target application 140.

That is, because 3P applications such as the target application 140 do not typically declare the actions the application can support, the intent controller 200 takes steps to ascertain what user intents the target application 140 may support. To this end, the intent controller 200 (e.g., with user consent), generates the contextual annotations 220 by using structural parsing and on-screen understanding (e.g., via an OCR or an application programming interface (API) 149) of different graphical elements of the UI 146 of the target application 140. For example, the intent controller 200 and/or the user bring the target application 140 to the foreground of a graphical user interface (GUI) 107 executing on the user device 102 such that the UI 146 of the target application 140 is visible. The annotations generator 210 translates the annotations 220 to the categorized actions 142.

Here, the UI 146 of the target application 140 has three contextual annotations 220, 220a-c. A first contextual annotation 220a represents a "To:" text field, a second contextual annotation 220b represents a "Subject:" text field, and a third contextual annotation 220c represents a "Compose email" text field. Based on these contextual annotations 220a-c, the intent controller 200 determines (e.g., via semantic processing) that the actions 142 associated with the target application 140 in this configuration are for composing and sending emails. Note that, while in this example, the contextual annotations 220 are primarily English words, the contextual annotations can be any language and/or be graphical representations (e.g., icons or other indicia).

In some implementations, the annotations generator 210 determines needed parameters 144 and parameters types for each action 142 determined from the contextual annotations 220. For example, based on the contextual annotation 220a, the annotations generator 210 determines that the action 142 associated with completing the "To:" field of the email requires a string as a parameter 144 and makes the appropriate association with the action 142. The intent controller 200 may sort or categorize the actions 142 together based on the intents the different actions 142 represent. The intent controller 200 may share the actions 142 and parameters 144 with the assistant application 110 and/or the remote system 111.

Referring now to FIG. 3, in some implementations, the assistant application 110 (or the intent controller 200), based on the user intent determined by the ASR engine 130 from the query 132 (e.g., the user intent expressed in the query 132 via the utterance 119), selects the appropriate set of categorized actions 142. In some examples, the target application 140 is in a foreground of the GUI 107 executing on the user device 102. In other examples, the target application 140 is in a background or is not currently executing on the user device 102. In either case, as shown by schematic view 300, the assistant application 110 (or intent controller 200) receives target application information 310 providing the assistant application 110 information regarding the target application 140. For example, the target application information 310 includes an identity of the target application 140 (i.e., the identity of the application currently at the foreground of the GUI 107) or other identifying information (e.g., identities of all email clients installed on the user device 102). Based on the query 132 and the target application information 310, the assistant application 110 selects the appropriate set of actions 142 that best reflect the user intent derived from the utterance 119.

In the illustrated example, three sets of categorized actions 142 are shown. A first set of actions 142a are directed toward replying to an email, a second set of actions 142 are directed toward sending an email, and a third set of actions 142n are directed toward deleting an email. Among the available options, the ASR engine 130 selects the set of actions 142b that represent the user intent of sending an email (based on the utterance 119 in this example). Here, the parameters 144 associated with the selected set of actions 142b and provisioned by the query 132 include a first parameter 144a that indicates that the recipient of the email is to be "jjones@gmail.com" and a second parameter 144b the body of the email is to include the text "Approved." Here, the second parameter 144b was extracted directly from the query 132. The first parameter 144a, however, was instead derived from "James." For example, the assistant application 110 retrieves, from the user's 10 contacts, all contacts with the first name James. The assistant application 110 may derive values for the parameters 144 from any other contextual information (e.g., frequency of messages from different contacts, recent messages, geographical location, names of foreground applications, etc.) available to the assistant application 110 and/or the remote system 111.

The set of actions 142 may be associated with parameters 144 that cannot be extracted or derived from the query 132. In these cases, the assistant application 110 may apply a default value or no value at all. Here, the selected set of actions 142b (i.e., the "send email" actions 142) and the associated parameters 144a,b are sent to the intent controller 200.

Figure 4:
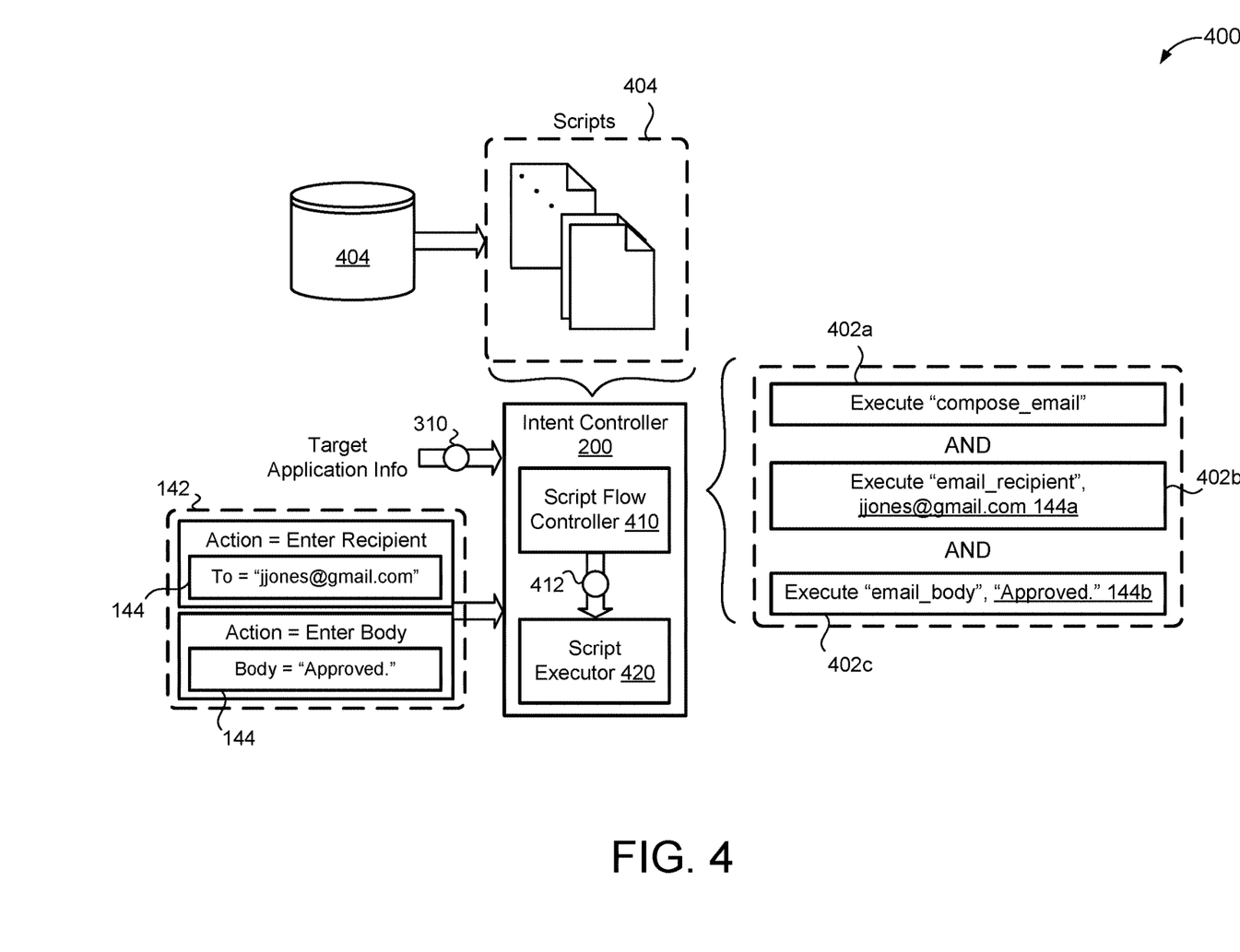
FIG. 4 is a schematic view of exemplary scripts of the system of FIG. 1.

Referring now to FIG. 4, in some implementations, the intent controller 200 includes a script flow controller 410. The script flow controller 410 selects the appropriate scripts (e.g., from the script storage 404) based on the selected actions 142 and the target application information 310. Here, the target application information 310 may include information such as the identity of the target application 140, a package name associated with the target application 140, a version of the target application 140, etc. Because UI elements of an application are different between different applications (e.g., two different email clients) and even different versions of the same application (e.g., buttons and text boxes in different locations), the script flow controller 410 determines compatible scripts 402 for the specific target application 140 based at least in part on the target application information 310. As shown in schematic view 400, the actions 142 in this example revolve around sending an email, however the script storage 404 may include many scripts for sending an email based on different email clients and different versions of those email clients.

Each script 402, when executed, implements one or more low-level interactions with the target application 140. Here, the low-level interactions 206 refer to interactions or operations with a minimal amount of abstraction between the description of the interaction and the actual implementation of the interaction. In some examples, the low-level interactions include actuating, at the UI 146 of the target application 140, a user input at a predetermined location on the UI 146 of the target application 140. That is, the scripts 402 may cause, on the UI 146 of the target application 140, buttons to be pressed or toggled, text to be entered, sliders moved, etc. For example, one script 402 may cause the target application 140 to register a UI selection at a specific location (to replicate the user 10 selecting a button on the UI 146). When the target application 140 includes an API 149 (FIG. 2), the intent controller 200 may additionally or alternatively interact with the target application 140 via the API 149.

The script flow controller 410, using the selected scripts 402 and, for example, logical operators (IF-THEN-ELSE, AND, OR, etc.) generates an execution flow 412 of the selected scripts 402. In some examples, the script flow controller 410 passes each respective script 402 the one or more parameters 144 associated with the script 402 and/or action 142. Some scripts 402 may include parameters 144 while others may not include parameters 144. Here, the script flow controller 410 has selected three scripts 402. The first script 402a "compose_email" is not associated with a parameters passed from or derived from the query 132. For example, this action requires selection of a "Compose Email" button or other input that does not require a parameter 144 from the user 10. The script flow controller 410 has also selected a second script 402b "email_recipient" and a third script 402c "email body." These two scripts are associated with a first parameter 144a ("jjones@gmail.com") and a second parameter 144b ("Approved.") respectively.

For example, the second script 402b will use the first parameter 144a to fill in a recipient text box 510, 510a (FIG. 5).

In this example, the three scripts 402a—c are joined with AND logical operators. However, it is understood that the script flow controller 410 may join any number of scripts 402 with any number of operators (OR, IF-THEN-ELSE, etc.), depending upon the complexity of the query 132 and the target application 140. The script flow controller 410 may pass the execution flow 412 to a script executor 420.

Referring now to FIG. 5, as shown in schematic view 500, the script executor 420, in some examples, executes each script 402 according to the execution flow 412 to interact with the target application 140 using the low-level operations 206 (e.g., via the script 402 replicating the user 10 interacting with a user input of the user device 102 such as a touch screen, keyboard, mouse, etc. or via the API 149). In this example, the low-level operations 206 include entering "jjones@gmail.com" in the text box 510a and "Approved" into a body text box 510, 510c. As shown in the examples of FIGS. 1-4, the user's utterance (i.e., "Send an email to James saying 'Approved.'") did not include a parameter 144 associated with a subject text box 510, 510a. In some examples (such as the example illustrated here), the intent controller 200 may rely on a default value in lieu of a value provided by the user 10. Here, the default value "Approved" may rely on some or all of the body text. In other examples, the intent controller 200 prompts the user for the additional information or attempts to derive the parameter 144 from other sources.

Figure 6:
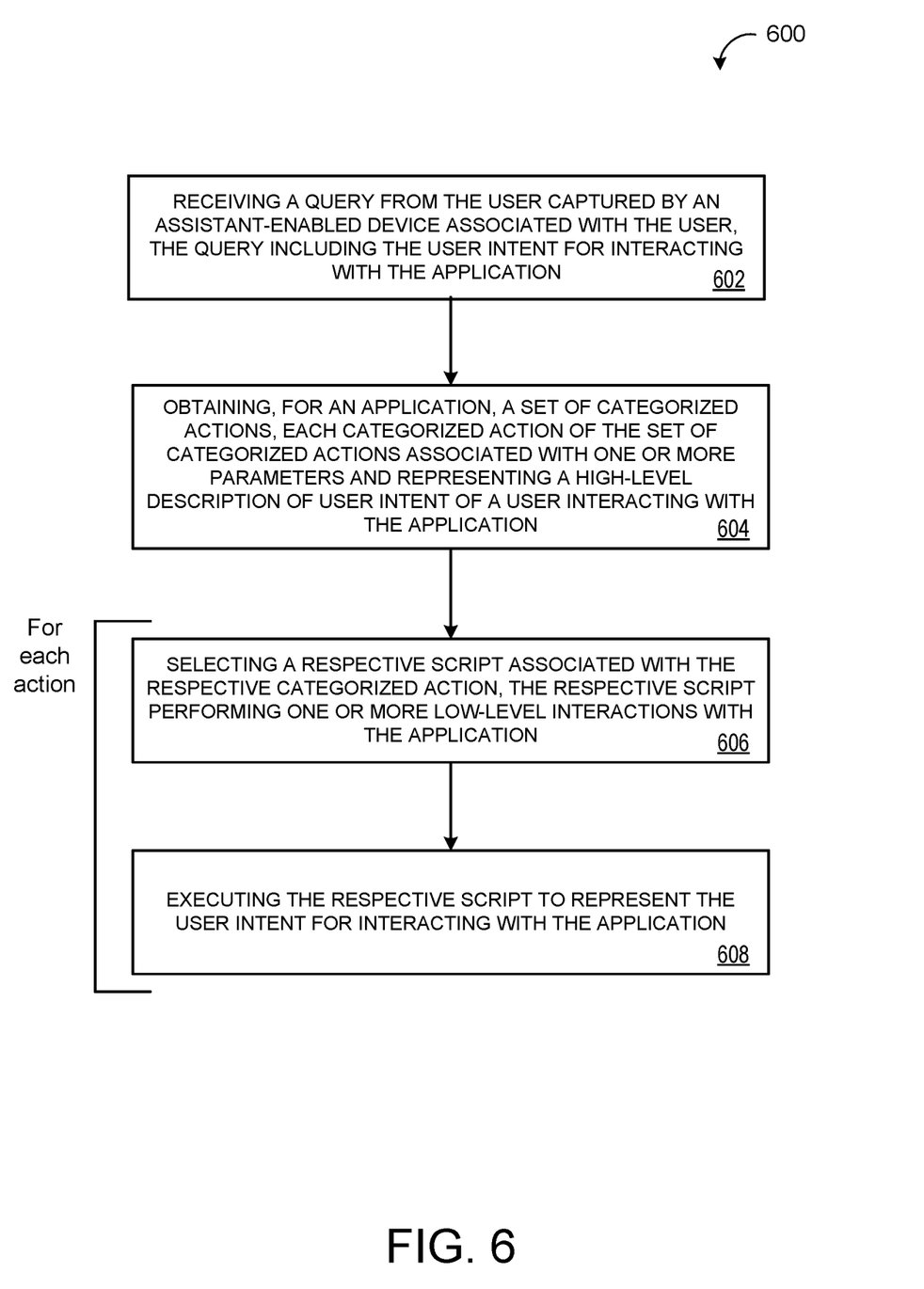
FIG. 6 is a flowchart of an example arrangement of operations for encoding and decoding user interface interactions.

FIG. 6 is a flowchart of an exemplary arrangement of operations for a method 600 of encoding and decoding user interface interactions. The computer-implemented method 600, when executed by data processing hardware 103, 112 causes the data processing hardware 103, 112 to perform operations. The method 600, at operation 602, includes receiving a query 132 from a user 10 captured by an assistant-enabled device 102 (i.e., a user device 102) associated with the user 10. The query 132 includes a user intent for interacting with an application 140. The method 600, at operation 604, includes obtaining, for the application 140, a set of categorized actions 142. Each categorized action 142 of the set of categorized actions 142 is associated with one or more parameters 144 and representing a high-level description of the user intent of the user 10 interacting with the application 140. At operation 606, the method 600 includes, for each respective categorized action 142 of the set of categorized actions 142, selecting a respective script 402 associated with the respective categorized action 142. The respective script 402 performs one or more low-level operations or interactions 206 with the application 140. At operation 608, the method 600 includes, for each respective categorized action 142 of the set of categorized actions 142, executing the respective script 402 to represent the user intent for interacting with the application 140.

Figure 7:
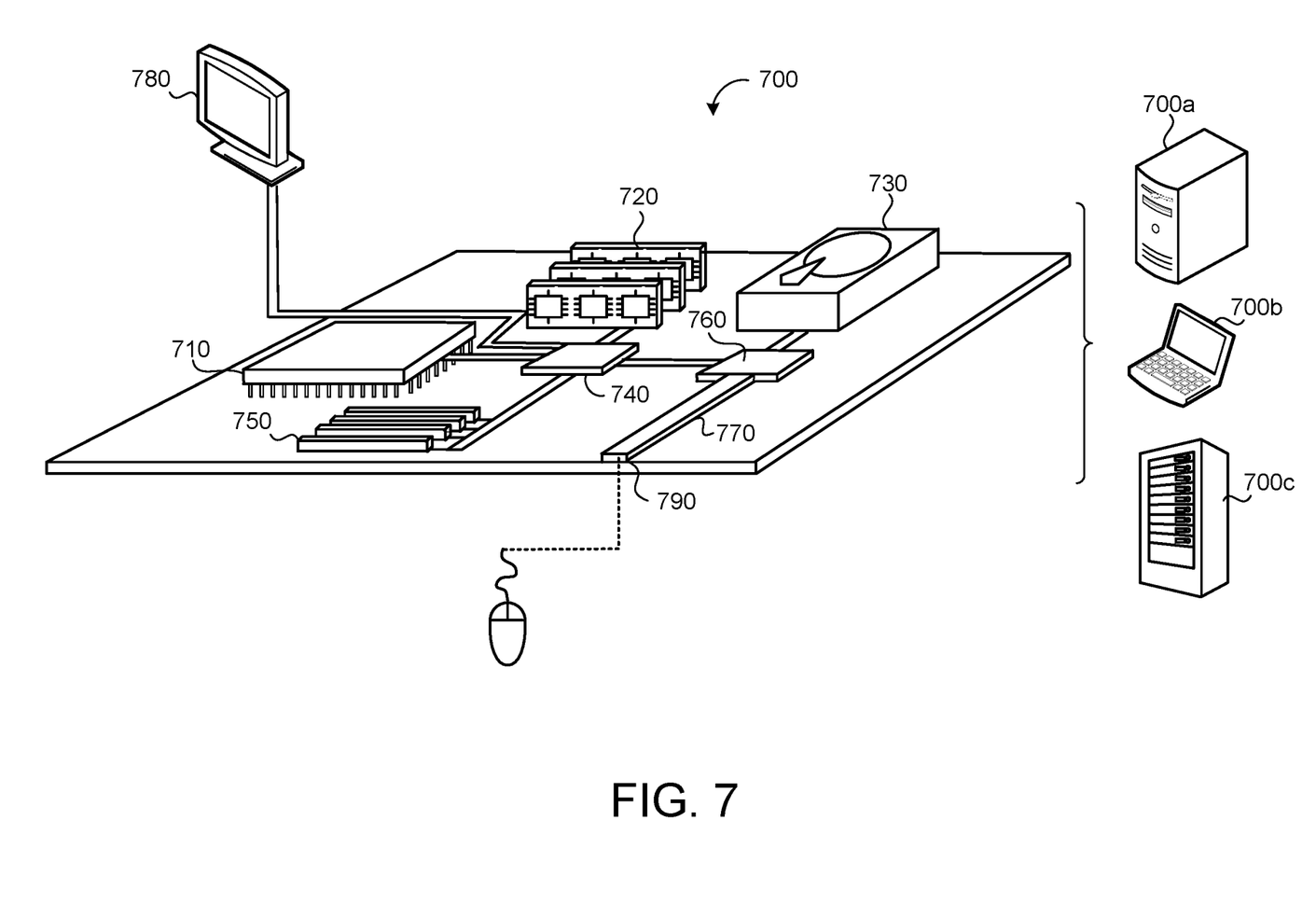
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   obtaining a query directed toward a digital assistant application executing on a user device, the query specifying a user intent for interacting with a target application not currently executing on the user device;
   obtaining an action for the target application, the action representing a high-level description of the user intent specified by the query for interacting with the target application;
   selecting an application-specific script from a plurality of application-specific scripts based on the target application and the action, each application-specific script of the plurality of application-specific scripts configured to cause a corresponding application to perform the action;
   based on the selected application-specific script, translating the action for the target application into a translated application-specific script, the translated application-specific script converting the high-level description of the user intent into an application-specific user interface interaction command for interacting with a user interface of the target application; and
   executing the translated application-specific script to fulfill the user intent specified by the query, wherein execution of the translated application-specific script causes the target application to input text in the user interface of the target application.

2. The computer-implemented method of claim 1, wherein obtaining the query comprises receiving audio data characterizing an utterance of the query spoken by a user and captured by the user device.

3. The computer-implemented method of claim 2, wherein the operations further comprise:
   processing, using an automated speech recognizer, the audio data to generate a transcription of the query,
   wherein obtaining the action for the target application comprises deriving, from the transcription of the query, the action for the target application.

4. The computer-implemented method of claim 1, wherein the query does not specify the target application.

5. The computer-implemented method of claim 4, wherein the operations further comprise:
   processing the query to obtain contextual clues from the query; and
   determining an identity of the target application based on the contextual clues obtained from the query.

6. The computer-implemented method of claim 5, wherein the operations further comprise:
   obtaining contextual information comprising software application installed on the user device,
   wherein determining the identity of the target application is further based on the obtained contextual information.

7. The computer-implemented method of claim 1, wherein the operations further comprise:
   receiving target application information associated with the target application,
   wherein selecting the application-specific script is further based on the target application information.

8. The computer-implemented method of claim 7, wherein the target application information comprises an identity of the target application and a version of the target application.

9. The computer-implemented method of claim 1, wherein, when obtaining the query directed toward the digital assistant application, the target application is not shown on a graphical user interface (GUI) executed by the user device.

10. The computer-implemented method of claim 1, wherein:
    the digital assistant application is configured to provide a digital assistant interface between the user device and a user of the user device; and
    the target application separate and independent from the digital assistant application.

11. A system comprising:
    data processing hardware; and
    memory hardware in communication with the data processing hardware, the memory hardware storing instructions that when executed on the data processing hardware cause the data processing hardware to perform operations comprising:
      obtaining a query directed toward a digital assistant application executing on a user device, the query specifying a user intent for interacting with a target application not currently executing on the user device;
      obtaining an action for the target application, the action representing a high-level description of the user intent specified by the query for interacting with the target application;
      selecting an application-specific script from a plurality of application-specific scripts based on the target application and the action, each application-specific script of the plurality of application-specific scripts configured to cause a corresponding application to perform the action;
      based on the selected application-specific script, translating the action for the target application into a translated application-specific script, the translated application-specific script converting the high-level description of the user intent into an application-specific user interface interaction command for interacting with a user interface of the target application; and executing the translated application-specific script to fulfill the user intent specified by the query, wherein execution of the translated application-specific script causes the target application to input text in the user interface of the target application.

12. The system of claim 11, wherein obtaining the query comprises receiving audio data characterizing an utterance of the query spoken by a user and captured by the user device.

13. The system of claim 12, wherein the operations further comprise:
processing, using an automated speech recognizer, the audio data to generate a transcription of the query, wherein obtaining the action for the target application comprises deriving, from the transcription of the query, the action for the target application.

14. The system of claim 11, wherein the query does not specify the target application.

15. The system of claim 14, wherein the operations further comprise:
processing the query to obtain contextual clues from the query; and
determining an identity of the target application based on the contextual clues obtained from the query.

16. The system of claim 15, wherein the operations further comprise:
obtaining contextual information comprising software application installed on the user device,
wherein determining the identity of the target application is further based on the obtained contextual information.

17. The system of claim 11, wherein the operations further comprise:
receiving target application information associated with the target application; and
selecting the application-specific script is further based on the target application information.

18. The system of claim 17, wherein the target application information comprises an identity of the target application and a version of the target application.

19. The system of claim 11, wherein, when obtaining the query directed toward the digital assistant application, the target application is not shown on a graphical user interface (GUI) executed by the user device.

20. The system of claim 11, wherein:
the digital assistant application is configured to provide a digital assistant interface between the user device and a user of the user device; and
the target application separate and independent from the digital assistant application.

* * * * *